United States Patent
Satish et al.

(10) Patent No.: US 11,765,198 B2
(45) Date of Patent: *Sep. 19, 2023

(54) SELECTING ACTIONS RESPONSIVE TO COMPUTING ENVIRONMENT INCIDENTS BASED ON SEVERITY RATING

(71) Applicant: Splunk Inc., San Francisco, CA (US)

(72) Inventors: Sourabh Satish, Fremont, CA (US); Oliver Friedrichs, Woodside, CA (US); Atif Mahadik, Fremont, CA (US); Govind Salinas, Sunnyvale, CA (US)

(73) Assignee: Splunk Inc., San Francisco, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 17/185,612

(22) Filed: Feb. 25, 2021

(65) Prior Publication Data

US 2021/0314347 A1    Oct. 7, 2021

Related U.S. Application Data

(63) Continuation of application No. 16/568,949, filed on Sep. 12, 2019, now Pat. No. 10,986,120, which is a
(Continued)

(51) Int. Cl.
*H04L 9/40* (2022.01)
*G06F 21/55* (2013.01)
(Continued)

(52) U.S. Cl.
CPC ........ *H04L 63/1441* (2013.01); *G06F 16/285* (2019.01); *G06F 21/554* (2013.01);
(Continued)

(58) Field of Classification Search
CPC ............. H04L 63/1441; H04L 63/0236; H04L 63/1416; H04L 63/1425; H04L 63/1433;
(Continued)

(56) References Cited

U.S. PATENT DOCUMENTS 6,405,318 B1    6/2002  Rowland
7,076,803 B2    7/2006  Bruton et al.
(Continued)

OTHER PUBLICATIONS

Non-Final Office Action, U.S. Appl. No. 16/863,557, dated Nov. 24, 2021, 17 pages.
(Continued)

*Primary Examiner* — Kambiz Zand
*Assistant Examiner* — Aubrey H Wyszynski
(74) *Attorney, Agent, or Firm* — NICHOLSON DE VOS WEBSTER & ELLIOTT LLP (57) ABSTRACT

Systems, methods, and software described herein provide enhancements for implementing security actions in a computing environment. In one example, a method of operating an advisement system to provide actions in a computing environment includes identifying a security incident in the computing environment, identifying a criticality rating for the asset, and obtaining enrichment information for the security incident from one or more internal or external sources. The method also provides identifying a severity rating for the security incident based on the enrichment information, and determining one or more security actions based on the enrichment information. The method further includes identifying effects of the one or more security actions on operations of the computing environment based on the criticality rating and the severity rating, and identifying a subset of the one or more security actions to respond to the security incident based on the effects.

20 Claims, 7 Drawing Sheets

Related U.S. Application Data continuation of application No. 15/924,759, filed on Mar. 19, 2018, now Pat. No. 10,476,905, which is a continuation of application No. 14/956,615, filed on Dec. 2, 2015, now Pat. No. 9,954,888.

(60) Provisional application No. 62/106,830, filed on Jan. 23, 2015, provisional application No. 62/106,837, filed on Jan. 23, 2015, provisional application No. 62/087,025, filed on Dec. 3, 2014.

(51) Int. Cl.
*G06F 16/28* (2019.01)
*H04L 47/2425* (2022.01)

(52) U.S. Cl.
CPC ...... *H04L 63/0236* (2013.01); *H04L 63/1416* (2013.01); *H04L 63/1425* (2013.01); *H04L 63/1433* (2013.01); *H04L 63/20* (2013.01); *H04L 47/2425* (2013.01)

(58) Field of Classification Search
CPC ... H04L 63/20; H04L 47/2425; G06F 16/285; G06F 21/554
USPC .......................................................... 726/25
See application file for complete search history.

(56) References Cited

U.S. PATENT DOCUMENTS

| | | | |
|---|---|---|---|
| 7,127,743 B1 | 10/2006 | Khanolkar et al. | |
| 7,174,566 B2 | 2/2007 | Yadav | |
| 7,469,301 B2 | 12/2008 | Daniell et al. | |
| 7,617,533 B1 | 11/2009 | Hernacki | |
| 7,657,927 B2 | 2/2010 | Tajalli et al. | |
| 7,900,259 B2 | 3/2011 | Jeschke et al. | |
| 7,950,056 B1 | 5/2011 | Satish et al. | |
| 8,042,171 B1 | 10/2011 | Nordstrom et al. | |
| 8,103,875 B1 | 1/2012 | Ramzan et al. | |
| 8,146,147 B2 | 3/2012 | Litvin et al. | |
| 8,185,953 B2 | 5/2012 | Rothstein et al. | |
| 8,261,317 B2 | 9/2012 | Litvin et al. | |
| 8,271,642 B1 | 9/2012 | Sankararaman et al. | |
| 8,291,495 B1 | 10/2012 | Burns et al. | |
| 8,336,094 B2 | 12/2012 | Litvin et al. | |
| 8,380,828 B1 | 2/2013 | Schlichter et al. | |
| 8,402,540 B2 | 3/2013 | Kapoor et al. | |
| 8,484,338 B2 | 7/2013 | Paster | |
| 8,516,575 B2 | 8/2013 | Burnside et al. | |
| 8,590,035 B2 | 11/2013 | Aaron | |
| 8,627,466 B2 | 1/2014 | Fisher et al. | |
| 8,676,970 B2 | 3/2014 | Boyns et al. | |
| 8,756,697 B2 | 6/2014 | Ocepek et al. | |
| 8,856,910 B1 | 10/2014 | Rostami-Hesarsorkh et al. | |
| 8,881,282 B1 | 11/2014 | Aziz et al. | |
| 8,914,878 B2 | 12/2014 | Burns et al. | |
| 8,924,469 B2 | 12/2014 | Raleigh et al. | |
| 8,943,123 B2 | 1/2015 | Miyazaki et al. | |
| 8,949,931 B2 | 2/2015 | Ermagan et al. | |
| 8,955,107 B2 | 2/2015 | Eyada | |
| 9,009,814 B1 | 4/2015 | Wertz et al. | |
| 9,009,824 B1 | 4/2015 | Chen et al. | |
| 9,049,226 B1 | 6/2015 | Duane | |
| 9,137,258 B2 | 9/2015 | Haugsnes | |
| 9,166,995 B1 | 10/2015 | Roundy | |
| 9,231,964 B2 | 1/2016 | Cross et al. | |
| 9,256,739 B1 | 2/2016 | Roundy et al. | |
| 9,258,319 B1 | 2/2016 | Rubin | |
| 9,306,965 B1 | 4/2016 | Grossman et al. | |
| 9,311,479 B1 | 4/2016 | Manni et al. | |
| 9,313,211 B1 | 4/2016 | Lototskiy | |
| 9,325,733 B1 | 4/2016 | Kolman et al. | |
| 9,336,385 B1 | 5/2016 | Spencer et al. | |
| 9,338,181 B1 | 5/2016 | Burns et al. | |
| 9,344,445 B2 | 5/2016 | Burns et al. | |
| 9,378,361 B1 | 6/2016 | Yen et al. | |
| 9,396,592 B2 | 7/2016 | Chapman et al. | |
| 9,489,516 B1 | 11/2016 | Lu et al. | |
| 9,680,846 B2 | 6/2017 | Haugsnes | |
| 9,712,555 B2 | 7/2017 | Satish et al. | |
| 9,729,572 B1 | 8/2017 | Adams et al. | |
| 9,762,607 B2 | 9/2017 | Satish et al. | |
| 9,871,818 B2 | 1/2018 | Satish et al. | |
| 9,954,888 B2* | 4/2018 | Satish | H04L 63/20 |
| 10,158,663 B2 | 12/2018 | Satish et al. | |
| 10,257,227 B1 | 4/2019 | Stickle et al. | |
| 10,425,440 B2 | 9/2019 | Satish et al. | |
| 10,425,441 B2 | 9/2019 | Satish et al. | |
| 10,476,905 B2* | 11/2019 | Satish | H04L 63/1441 |
| 10,986,120 B2* | 4/2021 | Satish | H04L 63/1441 |
| 11,019,092 B2* | 5/2021 | Satish | H04L 63/1425 |
| 11,019,093 B2 | 5/2021 | Satish et al. | |
| 11,165,812 B2* | 11/2021 | Satish | G06F 21/554 |
| 2004/0003286 A1 | 1/2004 | Kaler et al. | |
| 2004/0054498 A1 | 3/2004 | Shipp | |
| 2004/0111637 A1 | 6/2004 | Baffes et al. | |
| 2004/0250133 A1 | 12/2004 | Lim | |
| 2005/0055578 A1 | 3/2005 | Wright et al. | |
| 2005/0216956 A1 | 9/2005 | Orr et al. | |
| 2005/0235360 A1 | 10/2005 | Pearson | |
| 2005/0273857 A1 | 12/2005 | Freund | |
| 2006/0010493 A1 | 1/2006 | Piesco et al. | |
| 2006/0048209 A1* | 3/2006 | Shelest | H04L 9/40 726/1 |
| 2006/0059568 A1 | 3/2006 | Smith-Mickelson et al. | |
| 2006/0095965 A1 | 5/2006 | Phillips et al. | |
| 2006/0117386 A1 | 6/2006 | Gupta et al. | |
| 2006/0174342 A1 | 8/2006 | Zaheer et al. | |
| 2007/0168874 A1 | 7/2007 | Kloeffer et al. | |
| 2007/0169194 A1 | 7/2007 | Church et al. | |
| 2007/0180490 A1 | 8/2007 | Renzi et al. | |
| 2007/0255724 A1 | 11/2007 | Jung et al. | |
| 2008/0005782 A1 | 1/2008 | Aziz | |
| 2008/0082662 A1 | 4/2008 | Dandliker et al. | |
| 2008/0289028 A1 | 11/2008 | Jansen et al. | |
| 2009/0037548 A1 | 2/2009 | Ordille et al. | |
| 2009/0044277 A1 | 2/2009 | Aaron | |
| 2009/0165132 A1 | 6/2009 | Jain et al. | |
| 2010/0100962 A1 | 4/2010 | Boren | |
| 2010/0162347 A1 | 6/2010 | Barile | |
| 2010/0169973 A1 | 7/2010 | Kim et al. | |
| 2010/0251329 A1 | 9/2010 | Wei | |
| 2010/0281539 A1 | 11/2010 | Burns et al. | |
| 2010/0319004 A1 | 12/2010 | Hudson et al. | |
| 2010/0319069 A1 | 12/2010 | Granstedt et al. | |
| 2010/0325412 A1 | 12/2010 | Norrman et al. | |
| 2010/0325685 A1 | 12/2010 | Sanbower | |
| 2011/0161452 A1 | 6/2011 | Poornachandran et al. | |
| 2011/0238979 A1 | 9/2011 | Harp et al. | |
| 2012/0210434 A1 | 8/2012 | Curtis et al. | |
| 2012/0224057 A1 | 9/2012 | Gill et al. | |
| 2012/0311121 A1 | 12/2012 | Shafrir et al. | |
| 2012/0331553 A1 | 12/2012 | Aziz et al. | |
| 2013/0007882 A1* | 1/2013 | Devarajan | H04L 63/1416 726/24 |
| 2013/0081138 A1 | 3/2013 | Rados et al. | |
| 2013/0081141 A1 | 3/2013 | Anurag | |
| 2013/0091584 A1 | 4/2013 | Liebmann et al. | |
| 2013/0104203 A1 | 4/2013 | Davis et al. | |
| 2013/0276108 A1 | 10/2013 | Blackwell | |
| 2013/0291106 A1 | 10/2013 | Simonoff et al. | |
| 2013/0298230 A1 | 11/2013 | Kumar et al. | |
| 2013/0298244 A1 | 11/2013 | Kumar et al. | |
| 2013/0312092 A1 | 11/2013 | Parker | |
| 2013/0333032 A1 | 12/2013 | Delatorre et al. | |
| 2014/0007222 A1 | 1/2014 | Qureshi et al. | |
| 2014/0059641 A1 | 2/2014 | Chapman et al. | |
| 2014/0082726 A1 | 3/2014 | Dreller et al. | |
| 2014/0089039 A1 | 3/2014 | McClellan | |
| 2014/0137257 A1 | 5/2014 | Martinez et al. | |
| 2014/0165200 A1 | 6/2014 | Singla | |
| 2014/0165207 A1 | 6/2014 | Engel et al. | |
| 2014/0199663 A1 | 7/2014 | Sadeh-Koniecpol et al. | |
| 2014/0237599 A1 | 8/2014 | Gertner et al. | |

(56) References Cited

U.S. PATENT DOCUMENTS

| | | | |
|---|---|---|---|
| 2014/0245374 | A1 | 8/2014 | Deerman et al. |
| 2014/0259170 | A1 | 9/2014 | Amsler |
| 2014/0283049 | A1 | 9/2014 | Shnowske et al. |
| 2014/0310811 | A1 | 10/2014 | Hentunen |
| 2014/0344926 | A1 | 11/2014 | Cunningham et al. |
| 2014/0351441 | A1 | 11/2014 | Madani et al. |
| 2014/0351940 | A1 | 11/2014 | Loder et al. |
| 2015/0040217 | A1 | 2/2015 | Abuelsaad et al. |
| 2015/0143516 | A1 | 5/2015 | Sharpe et al. |
| 2015/0207813 | A1 | 7/2015 | Reybok et al. |
| 2015/0215325 | A1 | 7/2015 | Ogawa |
| 2015/0222647 | A1 | 8/2015 | Lietz et al. |
| 2015/0222656 | A1 | 8/2015 | Haugsnes |
| 2015/0304169 | A1 | 10/2015 | Milman et al. |
| 2015/0334132 | A1 | 11/2015 | Zombik et al. |
| 2015/0341384 | A1 | 11/2015 | Mandayam et al. |
| 2015/0347751 | A1 | 12/2015 | Card et al. |
| 2015/0347949 | A1 | 12/2015 | Dwyer et al. |
| 2015/0365438 | A1 | 12/2015 | Carver et al. |
| 2015/0381641 | A1 | 12/2015 | Cabrera et al. |
| 2015/0381649 | A1 | 12/2015 | Schultz et al. |
| 2016/0006749 | A1 | 1/2016 | Cohen et al. |
| 2016/0065608 | A1 | 3/2016 | Futty |
| 2016/0072836 | A1 | 3/2016 | Hadden et al. |
| 2016/0103992 | A1 | 4/2016 | Roundy et al. |
| 2016/0119379 | A1 | 4/2016 | Nadkarni |
| 2016/0164893 | A1 | 6/2016 | Levi |
| 2016/0164916 | A1 | 6/2016 | Satish et al. |
| 2016/0164917 | A1* | 6/2016 | Friedrichs ........... H04L 63/0236 726/1 |
| 2016/0241580 | A1 | 8/2016 | Watters et al. |
| 2016/0241581 | A1 | 8/2016 | Watters et al. |
| 2017/0214702 | A1 | 7/2017 | Moscovici et al. |
| 2017/0237762 | A1 | 8/2017 | Ogawa |
| 2020/0396237 | A1 | 12/2020 | Cohen et al. |

OTHER PUBLICATIONS

Notice of Allowance, U.S. Appl. No. 17/033,146, dated Jan. 10, 2022, 10 pages.
Notice of Allowance from U.S. Appl. No. 14/689,926, dated Nov. 8, 2017, 22 pages.
Notice of Allowance from U.S. Appl. No. 14/689,973, dated Jul. 27, 2017, 33 pages.
Notice of Allowance from U.S. Appl. No. 14/824,262, dated Nov. 22, 2017, 7 pages.
Notice of Allowance from U.S. Appl. No. 14/956,589, dated Apr. 23, 2018, 21 pages.
Notice of Allowance from U.S. Appl. No. 14/956,615, dated Dec. 18, 2017, 19 pages.
Notice of Allowance from U.S. Appl. No. 15/699,454, dated Aug. 9, 2018, 11 pages.
Notice of Allowance from U.S. Appl. No. 15/845,963, dated Jun. 26, 2018, 11 pages.
Notice of Allowance from U.S. Appl. No. 15/886,183, dated Sep. 19, 2018, 9 pages.
Notice of Allowance from U.S. Appl. No. 15/924,759, dated Jun. 13, 2019, 21 pages.
Notice of Allowance from U.S. Appl. No. 16/107,972, dated May 9, 2019, 18 pages.
Notice of Allowance from U.S. Appl. No. 16/107,975, dated May 13, 2019, 18 pages.
Notice of Allowance, U.S. Appl. No. 14/674,679, dated Jun. 20, 2017, 5 pages.
Notice of Allowance, U.S. Appl. No. 14/674,679, dated May 12, 2017, 4 pages.
Notice of Allowance, U.S. Appl. No. 14/675,176, dated Dec. 30, 2019, 6 pages.
Notice of Allowance, U.S. Appl. No. 14/689,926, dated Dec. 20, 2017, 6 pages.
Notice of Allowance, U.S. Appl. No. 14/689,973, dated Aug. 10, 2017, 6 pages.
Notice of Allowance, U.S. Appl. No. 14/824,262, dated Jan. 5, 2018, 4 pages.
Notice of Allowance, U.S. Appl. No. 14/868,553, dated Jun. 26, 2020, 8 pages.
Notice of Allowance, U.S. Appl. No. 15/699,454, dated Nov. 20, 2018, 6 pages.
Notice of Allowance, U.S. Appl. No. 16/107,979, dated Oct. 7, 2019, 14 pages.
Notice of Allowance, U.S. Appl. No. 16/142,913, dated Aug. 30, 2019, 21 pages.
Notice of Allowance, U.S. Appl. No. 16/182,914, dated Dec. 4, 2019, 5 pages.
Notice of Allowance, U.S. Appl. No. 16/568,949, dated Jan. 7, 2021, 9 pages.
Paudice, Andrea; Sarkar, Santonu; Cotroneo, Dominco; "An Experiment with Conceptual Clustering for the Analysis of Security Alerts", IEEE International Symposium on Software Reliability Engineering Workshops, Nov. 3-6, 2014, pp. 335-340.
Final Office Action, U.S. Appl. No. 14/675,176, dated Jan. 26, 2021, 18 pages.
Final Office Action, U.S. Appl. No. 16/736,120, dated Jan. 6, 2021, 15 pages.
Hasegawa, Hirokazu; Yamaguchi, Yukiko; Shimada, Hajime; Takakura; Hiroki; "A Countermeasure Recommendation System against Targeted Attacks with Preserving Continuity of Internal Networks", 38th Annual Computer Software and Applications Conference, IEEE, Jul. 21-25, 2014, pp. 400-405.
Hershey, Paul C., Ph.D.; Silio, Jr., Charles B., Ph.D.; "Procedure for Detection of and Response to Distributed Denial of Service Cyber Attacks on Complex Enterprise Systems", International Systems Conference SysCon, IEEE, Mar. 19-22, 2012, 6 pages.
Notice of Allowance, U.S. Appl. No. 14/677,493, dated Jan. 22, 2021, 6 pages.
Notice of Allowance, U.S. Appl. No. 16/539,918, dated Jan. 22, 2021, 7 pages.
Tejay, Gurvirender P.S.; Zadig, Sean M.; "Investigating the Effectiveness of IS Security Countermeasures Towards Cyber Attacker Deterrence", 45th Hawaii International Conference on System Sciences, IEEE, Jan. 4-7, 2012, pp. 3051-3060.
Notice of Allowance, U.S. Appl. No. 14/675,176, dated Jul. 7, 2021, 7 pages.
Notice of Allowance, U.S. Appl. No. 16/042,283, dated Jul. 28, 2020, 17 pages.
Abandonment Notice, U.S. Appl. No. 14/675,075, dated Feb. 8, 2017, 2 pages.
Advisory Action, U.S. Appl. No. 14/868,553, dated Jan. 24, 2019, 3 pages.
Aguirre, Idoia; Alonso, Sergio; "Improving the Automation of Security Information Management: A Collaborative Approach", IEEE Security & Privacy, vol. 10, Issue 1, Oct. 25, 2011, pp. 55-59.
Final Office Action from U.S. Appl. No. 14/674,679, dated Sep. 22, 2016, 19 pages.
Final Office Action from U.S. Appl. No. 14/677,493, dated Aug. 24, 2017, 29 pages.
Final Office Action from U.S. Appl. No. 14/677,493, dated Nov. 25, 2016, 23 pages.
Final Office Action from U.S. Appl. No. 14/677,493, dated Nov. 13, 2018, 20 pages.
Final Office Action from U.S. Appl. No. 14/824,262, dated Apr. 6, 2017, 22 pages.
Final Office Action from U.S. Appl. No. 14/868,553, dated Oct. 15, 2018, 19 pages.
Final Office Action from U.S. Appl. No. 14/868,553, dated Oct. 18, 2017, 19 pages.
Final Office Action from U.S. Appl. No. 14/956,589, dated Nov. 22, 2017, 27 pages.
Final Office Action from U.S. Appl. No. 15/924,759, dated Aug. 1, 2018, 13 pages.
Final Office Action from U.S. Appl. No. 16/107,979, dated Jun. 13, 2019, 14 pages.

(56) References Cited

OTHER PUBLICATIONS

Final Office Action received for U.S. Appl. No. 16/182,914, dated Sep. 18, 2019, 6 pages.
Final Office Action, U.S. Appl. No. 14/675,176, dated Nov. 25, 2016, 21 pages.
Final Office Action, U.S. Appl. No. 14/675,176, dated Sep. 25, 2017, 31 pages.
Final Office Action, U.S. Appl. No. 16/568,949, dated Oct. 28, 2020, 19 pages.
Final Office Action, U.S. Appl. No. 14/677,493, dated Jan. 16, 2020, 16 pages.
Non-Final Office Action from U.S. Appl. No. 15/886,183, dated Mar. 22, 2018, 21 pages.
Non-Final Office Action from U.S. Appl. No. 16/107,972, dated Dec. 31, 2018, 11 pages.
Non-Final Office Action from U.S. Appl. No. 16/142,913, dated Apr. 30, 2019, 33 pages.
Non-Final Office Action from U.S. Appl. No. 14/674,679, dated Jun. 2, 2016, 16 pages.
Non-Final Office Action from U.S. Appl. No. 14/675,075, dated Jul. 11, 2016, 13 pages.
Non-Final Office Action from U.S. Appl. No. 14/677,493, dated Aug. 2, 2019, 26 pages.
Non-Final Office Action from U.S. Appl. No. 14/677,493, dated Jul. 11, 2016, 17 pages.
Non-Final Office Action from U.S. Appl. No. 14/677,493, dated May 1, 2017, 25 pages.
Non-Final Office Action from U.S. Appl. No. 14/677,493, dated May 14, 2018, 23 pages.
Non-Final Office Action from U.S. Appl. No. 14/689,926, dated May 8, 2017, 34 pages.
Non-Final Office Action from U.S. Appl. No. 14/689,973, dated Jan. 25, 2017, 18 pages.
Non-Final Office Action from U.S. Appl. No. 14/824,262, dated Jul. 13, 2017, 20 pages.
Non-Final Office Action from U.S. Appl. No. 14/824,262, dated Oct. 7, 2016, 16 pages.
Non-Final Office Action from U.S. Appl. No. 14/868,553, dated Mar. 26, 2018, 22 pages.
Non-Final Office Action from U.S. Appl. No. 14/868,553, dated May 26, 2017, 16 pages.
Non-Final Office Action from U.S. Appl. No. 14/956,589, dated May 31, 2017, 33 pages.
Non-Final Office Action from U.S. Appl. No. 14/956,615, dated Jul. 28, 2017, 46 pages.
Non-Final Office Action from U.S. Appl. No. 15/699,454, dated Feb. 8, 2018, 19 pages.
Non-Final Office Action from U.S. Appl. No. 15/845,963, dated Feb. 12, 2018, 27 pages.
Non-Final Office Action from U.S. Appl. No. 15/924,759, dated Feb. 26, 2019, 20 pages.
Non-Final Office Action from U.S. Appl. No. 16/107,975, dated Jan. 4, 2019, 11 pages.
Non-Final Office Action from U.S. Appl. No. 16/107,979, dated Oct. 18, 2018, 14 pages.
Non-Final Office Action from U.S. Appl. No. 16/182,914, dated May 30, 2019, 23 pages.
Non-Final Office Action, U.S. Appl. No. 14/675,176, dated Apr. 17, 2017, 22 pages.
Non-Final Office Action, U.S. Appl. No. 14/675,176, dated Jul. 18, 2016, 18 pages.
Non-Final Office Action, U.S. Appl. No. 14/675,176, dated Jul. 14, 2020, 18 pages.
Non-Final Office Action, U.S. Appl. No. 14/677,493, dated Jul. 14, 2020, 18 pages.
Non-Final Office Action, U.S. Appl. No. 16/042,283, dated Jan. 24, 2020, 25 pages.
Non-Final Office Action, U.S. Appl. No. 16/539,918, dated Jul. 16, 2020, 14 pages.
Non-Final Office Action, U.S. Appl. No. 16/568.949, dated Mar. 19, 2020, 18 pages.
Notice of Allowance and Fees Due (PTOL-85) dated Jan. 7, 2021 for U.S. Appl. No. 16/568,949.
Notice of Allowance from U.S. Appl. No. 14/674,679, dated Apr. 18, 2017, 20 pages.
Final Office Action, U.S. Appl. No. 17/326,070, dated Jan. 19, 2023, 19 pages.
Non-Final Office Action, U.S. Appl. No. 17/242,165, dated Jan. 25, 2023, 15 pages.
Notice of Allowance, U.S. Appl. No. 16/863,557, dated Jan. 12, 2023, 6 pages.
Final Office Action, U.S. Appl. No. 16/863,557, dated Apr. 7, 2022, 18 pages.
Non-Final Office Action, U.S. Appl. No. 16/863,557, dated Aug. 25, 2022, 18 pages.
Non-Final Office Action, U.S. Appl. No. 17/104,537, dated Jul. 20, 2022, 16 pages.
Non-Final Office Action, U.S. Appl. No. 17/306,703, dated Sep. 9, 2022, 15 pages.
Non-Final Office Action, U.S. Appl. No. 17/326,070, dated Aug. 16, 2022, 20 pages.
Non-Final Office Action, U.S. Appl. No. 17/513,595, dated Dec. 30, 2022, 15 pages.
Notice of Allowance, U.S. Appl. No. 17/306,703, dated Jan. 11, 2023, 7 pages.

\* cited by examiner

SELECTING ACTIONS RESPONSIVE TO COMPUTING ENVIRONMENT INCIDENTS BASED ON SEVERITY RATING

RELATED APPLICATIONS

This application claims benefit under 35 U.S.C. § 120 as a continuation of U.S. patent application Ser. No. 16/568,949, entitled "SELECTING ACTIONS RESPONSIVE TO COMPUTING ENVIRONMENT INCIDENTS BASED ON ACTION IMPACT INFORMATION," filed on Sep. 12, 2019, which is a continuation of U.S. patent application Ser. No. 15/924,759, entitled "SECURITY ACTIONS FOR COMPUTING ASSETS BASED ON ENRICHMENT INFORMATION," filed on Mar. 19, 2018, now U.S. Pat. No. 10,476,905, which is a continuation of U.S. patent application Ser. No. 14/956,615, entitled "SECURITY ACTIONS FOR COMPUTING ASSETS BASED ON ENRICHMENT INFORMATION," filed on Dec. 2, 2015, now U.S. Pat. No. 9,954,888, which claims priority to U.S. Provisional Patent Application No. 62/087,025, entitled "ACTION RECOMMENDATIONS FOR COMPUTING ASSETS BASED ON ENRICHMENT INFORMATION," filed on Dec. 3, 2014; U.S. Provisional Patent Application No. 62/106,830, entitled "ACTION RECOMMENDATIONS FOR ADMINISTRATORS IN A COMPUTING ENVIRONMENT," filed on Jan. 23, 2015; and U.S. Provisional Patent Application No. 62/106,837, entitled "SECURITY ACTIONS IN A COMPUTING ENVIRONMENT," filed on Jan. 23, 2015, and which are hereby incorporated by reference in their entireties.

TECHNICAL FIELD

Aspects of the disclosure are related to computing environment security, and in particular to implementing security actions in a computing environment.

TECHNICAL BACKGROUND

An increasing number of data security threats exist in the modern computerized society. These threats may include viruses or other malware that attacks the local computer of the end user, or sophisticated cyber attacks to gather data and other information from the cloud or server based infrastructure. This server based infrastructure includes real and virtual computing devices that are used to provide a variety of services, such as data storage, cloud processing, web sites and services, amongst other possible services. To protect applications and services, various antivirus, encryption, and firewall implementations may be used across an array of operating systems, such as Linux and Microsoft Windows.

Further, computing environments may implement security information and event management (STEM) systems to provide real-time analysis of security alerts generated by network hardware and applications. In particular, SIEM systems allow for real-time monitoring, correlation of events, notifications, and console views for end users. Further, SIEM systems may provide log storage capable of managing historical information about various security events within the network. Although SIEMs generate security alerts within the network, administrators may be forced to translate each of these alerts into particular action. Thus, time and resources that could be used on other tasks may be used in researching and determining the course of action to handle the possible security threat.

OVERVIEW

Provided herein are methods, systems, and software to implement security actions in a computing environment. In one example, a method of operating an advisement system to provide actions in a computing environment includes identifying a security incident in the computing environment, identifying a criticality rating for the asset, and obtaining enrichment information for the security incident from one or more internal or external sources. The method also provides identifying a severity rating for the security incident based on the enrichment information, and determining one or more security actions based on the enrichment information. The method further includes identifying effects of the one or more security actions on operations of the computing environment based on the criticality rating and the severity rating, and identifying a subset of the one or more security actions to respond to the security incident based on the effects.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Security information and event management (SIEM) systems provide analysis of security alerts generated by network hardware and processes. The network hardware and processes may include routers, firewalls, operating systems, applications executing on one or more computing devices, switches, or intrusion detection systems, amongst a variety of other network devices and processes. During the analysis of the particular network, a SIEM system may identify an issue and flag the issue as a possible security threat. Once flagged, the SIEM system may provide information to an administrator or store information about the threat to be analyzed for a possible solution.

Here, in addition to the operations provided by the SIEM system or other security monitoring systems within a computing environment, an advisement system may be used to identify and recommend the appropriate course of action to the related administrator. For example, if a SIEM system identified a possible security threat within a router of the network, information about the threat could be transferred to the advisement system, supplementary information about the threat could be identified from internal and external sources, and a recommendation could be determined based on the gathered supplementary information and a preconfigured rule set. Once the action recommendations are determined, the recommendations may be provided to an administrator, allowing the administrator to select a desired action and implement the action within the computing environment. In some implementations, the advisement system may be configured to provide a workflow allowing the administrator to step through the necessary steps of implementing the action. In other implementations, the advisement system may include connector or translator software modules that may automate or script the process of implementing the desired modification to the asset or computing environment. Thus, for each different type of asset within the environment, a connector may be provided to implement actions, such as blocking a particular process, blocking a particular network address, taking a snapshot of a computing environment, or other possible actions.

In some implementations, to manage the various rule sets for the advisement system, one or more data structures may be accessible by the advisement system that relate rule sets to assets, incidents, and enrichment information. For example, an incident may be reported for an unknown process executing on a virtual machine asset. Once enrichment information is gathered about the unknown process, the advisement system may identify a rule set that applies to virtual machines, unknown processes, and the enrichment information determined about the unknown process. Accordingly, an unknown process that is known to be malicious from the enrichment information may be associated with a different rule set than an unknown process that cannot be confirmed to be malicious.

Figure 1:
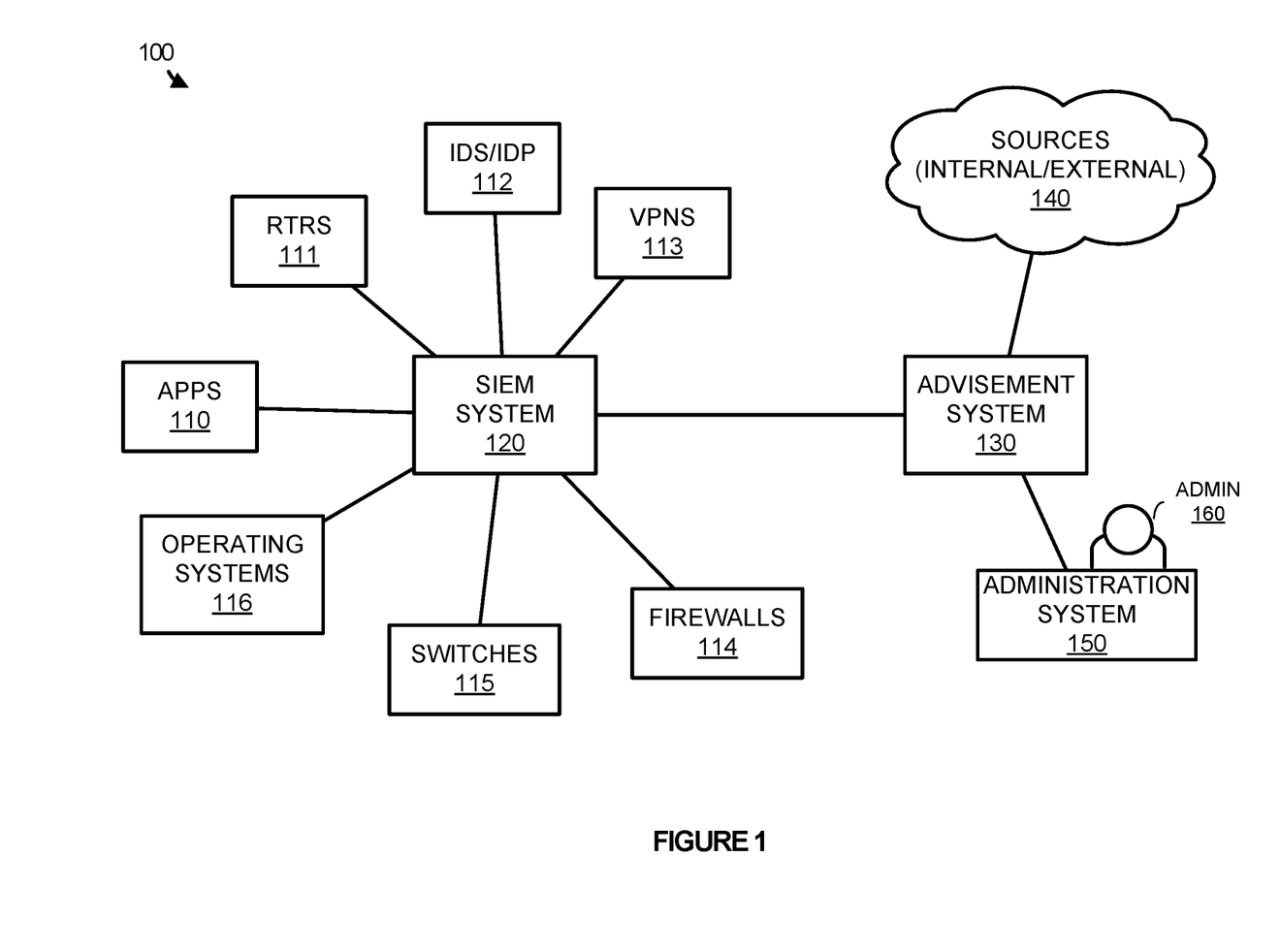
FIG. 1 illustrates a computing environment to provide action recommendations for a plurality of network assets.

To further illustrate the operation of an advisement system within a computing network, FIG. 1 is provided. FIG. 1 illustrates a computing environment 100 to provide action recommendations for a plurality of network assets. Computing environment 100 includes computing assets 110-116, SIEM system 120, advisement system 130, sources 140, and administration system 150. Computing assets 110-116 include applications 110, routers 111, intrusion detection systems and intrusion prevention system (IDS/IDP) 112, virtual private networks (VPNs) 113, firewalls 114, switches 115, and operating systems 116, although other assets may exist. Assets 110-116 may execute via any number of computing systems or devices. In addition to the routers and switches, these computing devices may include server computers, desktop computers, laptop computers, and the like. Although not illustrated in the present example, in some implementations, assets may be defined at computing system level. Accordingly, assets may be defined as servers, end user computing systems, host computing systems, and the like that each include an operating system, applications, processes, and firewalls.

SIEM system 120, advisement system 130, sources 140, and administration system 150 may each include communication interfaces, network interfaces, processing systems, computer systems, microprocessors, storage systems, storage media, or some other processing devices or software systems, and can be distributed among multiple devices. STEM system 120, advisement system 130, and sources 140 may comprise one or more server, desktop, laptop, or other similar computing devices. Administration system 150 may comprise an end user device, such as a desktop computer, laptop computer, smartphone, tablet, or any other similar computing device.

Advisement system 130 communicates with STEM system 120, sources 140, and administration system 150 via communication links that may use Time Division Multiplex (TDM), asynchronous transfer mode (ATM), internet protocol (IP), Ethernet, synchronous optical networking (SONET), hybrid fiber-coax (HFC), circuit-switched communication signaling, wireless communications, or some other communication format, including combinations and improvements thereof. Similarly, STEM system 120 may gather information from assets 110-116 via a plurality of communication links to the computing systems associated with the assets, wherein the links may use TDM, ATM, IP, Ethernet, SONET, HFC, circuit-switched communication signaling, wireless communications, or some other communication format, including combinations and improvements thereof. While not illustrated in the present example, it should be understood that advisement system 130 might communicate with the assets over various communication links and communication formats to implement desired security actions.

In operation, SIEM system 120 receives data and performance information from assets 110-116 and performs inspections to identify possible security issues. Once SIEM system 120 identifies a possible security threat, information about the security threat is transferred to advisement system 130. Advisement system 130 identifies the security threat and analyzes the threat using sources 140 to determine suggested actions against the security threat. Once the suggested actions are determined, the actions are transferred, via email, text message, or other similar format, to administration system 150 to be presented to administrator 160.

Figure 2:
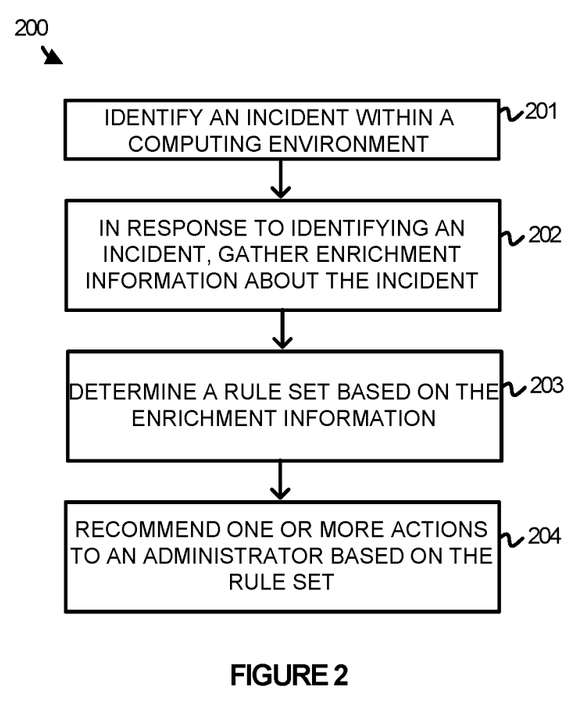
FIG. 2 illustrates a method of operating an advisement system to provide action recommendations for a plurality of network assets according to one implementation.

To further illustrate the operation of computing environment 100, FIG. 2 is provided. FIG. 2 illustrates a method 200 of operating advisement system 130 to provide action recommendations for a plurality of network assets. In particular, as described in FIG. 1, SIEM system 120 receives information from a plurality of network assets 110-116 and identifies security threats based on the information. Once a threat is identified, the threat is transferred to advisement system 130. Advisement system 130 identifies the security threat or incident within computing environment 100 (201), and in response to identifying the incident, gathers enrichment information about the incident (202). Specifically, advisement system 130 may identify properties or traits of the incident, such as internet protocol (IP) addresses associated with the incident, the firewall associated with the incident, the computing device for the incident, the host of the incident, the user or user name associated with the incident, the file name for the incident, the service name for the incident, any uniform resource locators (URLs) associated with the incident, or any other information specific to the security incident. Once the properties are identified, advisement system 130 may use the properties to identify information related to the threat using internal and external sources 140, wherein sources 140 may be searched using the identified properties. These sources may include databases or websites that keep track of malicious IP addresses or domain names, the type of threats presented from the particular domain names, identifies of malware, Trojans, and viruses, amongst a variety of other information.

Upon determining enrichment information related to a particular incident, administration system 130 may determine a rule set based on the enrichment information (203). This rule set is related to the type of threat presented to computing environment 100, and may include one or more security actions associated with a particular threat. For example, as enrichment information is gathered related to a particular incident, administration system 130 may use predefined criteria to establish how likely the identified incident is a security threat to computing environment 100. Based on this likelihood and a corresponding related rule set, one or more actions may be recommended to administrator 160 on administration system 150 (204).

For instance, STEM system 120 may identify that an application of applications 110 is receiving a large amount of inbound requests from a particular IP address and flag these requests as a possible incident. Once flagged, information or traits regarding the inbound requests and the application is transferred to advisement system 130 including the IP address, the type of data requested, or any other information related to the request. Upon identifying the flagged incident, advisement system 130 determines enrichment information for the incident via sources 140. If advisement system 130 determines that the incident is likely a security threat based on the enrichment information, advisement system 130 may determine suggested actions based on an identified rule set, and provide the actions to an administrator responsible for the application via email, text message, or some other form of communication. These actions may include preventing the application from future execution, sand boxing the computing system executing the application, taking an image of the computing system executing the application, removing the security threat within the application, amongst a variety of other actions. For example, if the enrichment information identifies that the inbound requesting IP address is associated with malicious operations, advisement system 130 may recommend sand boxing the computing system, or implementing a firewall configuration that prevents generating a response to requests from the particular IP address. In contrast, if the IP address is unknown or sources 140 do not indicate that the IP address is malicious, advisement system 130 may select a different rule set and corresponding action recommendations that could allow further monitoring of the interactions between the asset and the unknown IP address.

In some implementations, gathering information about the security incident may further include gathering information about related processes within the environment. For example, if an application is identified as exhibiting unusual behavior related to a possible security threat, the advisement system may identify other processes executing on one or more devices that are related to the application. Accordingly, if it is determined that the application is required by other processes, recommendations may be determined that allow the other processes to continue to use the application, but may limit or further monitor other interactions initiated by the flagged application. These recommendations may include taking a snapshot of the application or of the full computing system to identify any unusual process within the application, prevent the application from initiating communications with external systems and processes, or any other similar function that allows the required processes to continue to communicate with the required application.

In some instances, the advisement system may have access to a database of known applications and executables within the computing environment, which can be compared to the application related to the incident. For example, an executable may be titled RESEARCH.EXE. Once an incident is identified that is related to RESEARCH.EXE, the advisement system may attempt to identify any other system or process that requires or acknowledges that executable. If no other system or process requires or acknowledges the executable, recommendations may be made that can remove that application, or otherwise prevent the operation of RESEARCH.EXE.

In some examples, the rule set for a particular security incident may identify a preconfigured action to take against the threat. Thus, in addition to or in place of recommending actions to an administrator, an administrator may preapprove certain actions against particular security incidents. Although illustrated in the present example as receiving information about an incident from a STEM system, it should be understood that other security systems, such as security processes on the individual computing devices, might provide the security threat information to the advisement system. In some implementations, a user or administrator may define a security incident in the environment, which can then be identified by the advisement system. This user or administrator defined incident may allow the personnel to define various information about the incident, including the asset involved in the incident, a computing device identifier for the incident, the type of suspected threat, or any other similar characteristic or trait from the incident. Once defined, the advisement system may gather enrichment information related to the incident from internal and external sources. As the enrichment information is gathered, a rule set may be identified and action recommendations determined for the threat.

In some implementations, advisement system 130 may be configured to generate a display of the action recommendations and provide the display to the administrator either locally on advisement system 130, or externally on a console such as administration system 150. This display may include the various action recommendations as well as other relevant security event characteristics. These characteristics may include a chat room that allows the administrator to chat with any other administrator associated with the particular threat, a summary window that displays information about the threat, such as an identifier for the asset, IP address information for the security incident, a URL associated with the security incident, or other similar information.

In some instances, advisement system 130 may manage criticality information or ratings for each of the assets within the computing environment. These ratings may be numerical ratings, letter ratings, or any other method of generating a hierarchy of the assets within the environment. These rankings may be assigned by an administrator of the computing environment or may be generated dynamically based on the characteristics of the computing asset. These characteristics may include, but are not limited to, the operation that the asset is providing for the environment, the user associated with the asset, or the data that is accessed or stored by the asset.

Further, in some implementations, based on the enrichment information that is received from sources 140, advisement system 130 may determine a severity level or rating for the security incident. This rating may be determined based on the threat that the incident is providing to the asset and the entire computing environment. For example, if sources 140 indicated that a process were a virus, a severity rating would be higher than if the process were a known useful software application for the computing environment.

Once the severity rating and the criticality rating are determined, the severity rating and criticality rating may be applied to a set of possible security actions to determine the effect that the actions would have on the operation of the computing environment. In particular, if an asset is important to the computing environment, but an action would cause the asset to be inoperable for an extended period of time, the action may not be as desirable as another action that would not cause the asset to go down for the extended period of time. Similarly, if the asset were critical and the threat were also determined to be severe, the negative effect of having the asset down for a period of time would be less important than removing the threat that caused the incident. Thus, both positive and negative effects of an action may be weighed in light of the severity and criticality ratings to determine the overall effect of the action on the environment. Once the effects are determined, a subset of the possible actions may be identified using the effects on the computing environment, wherein the subset may be implemented by advisement system 130, or supplied to an administrator for selection of the security actions. In some implementations, various algorithms and data structures may be applied by advisement system 130 to determine the subset of actions based on the criticality and severity ratings.

Figure 3:
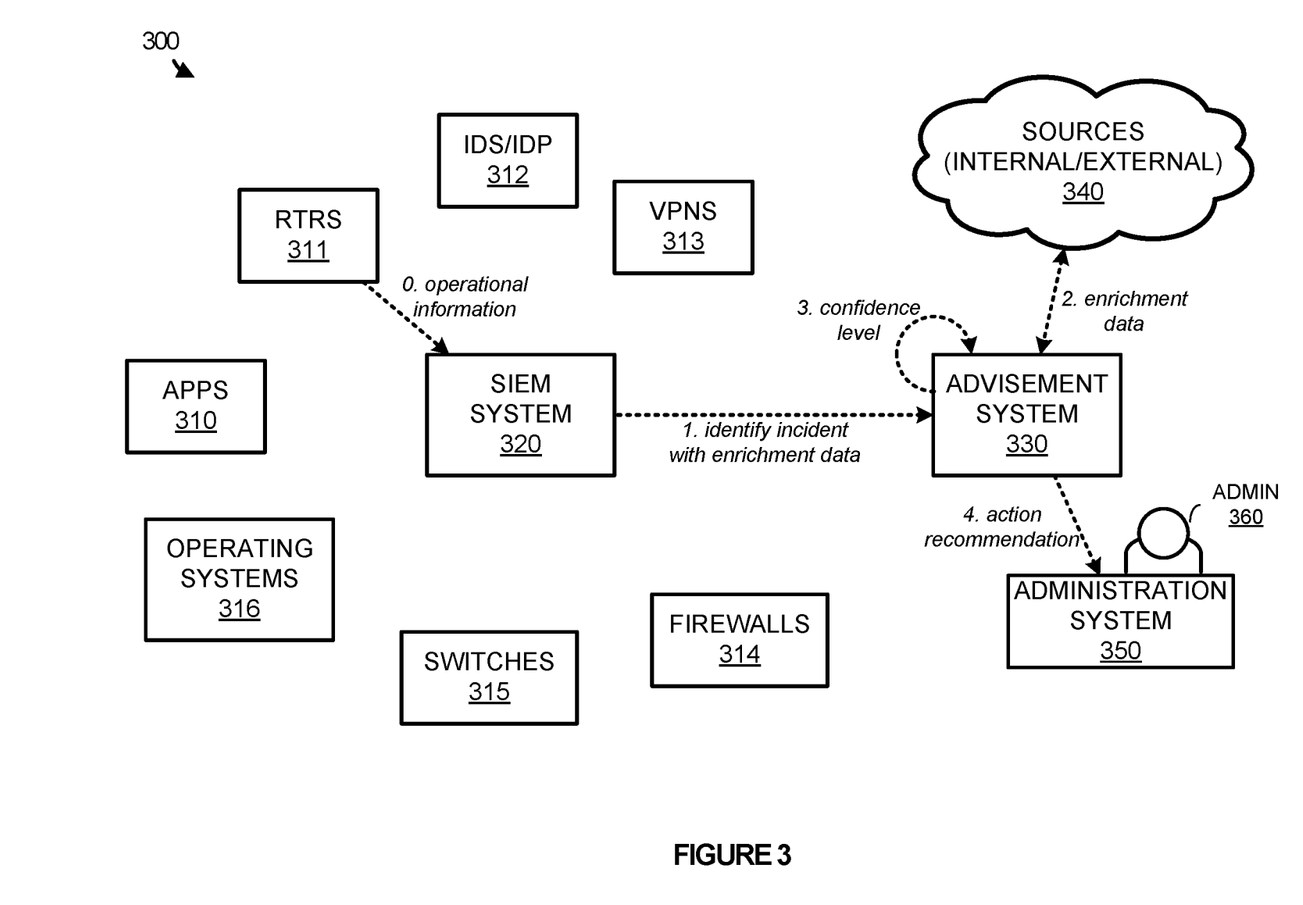
FIG. 3 illustrates an overview of generating action recommendations for a network asset.

To further demonstrate the process of generating actions for an administrator, FIG. 3 is included. FIG. 3 illustrates an overview 300 of generating action recommendations for a network asset. Overview 300 includes computing assets 310-316, STEM system 320, advisement system 330, sources 340, and administration system 350. Computing assets 310-316 include applications 310, routers 311, intrusion detection systems and intrusion prevention system (IDS/IDP) 312, virtual private networks (VPNs) 313, firewalls 314, switches 315, and operating systems 316. Assets 310-316 may execute via any number of computing systems or devices. In addition to the routers and switches, these computing devices may include server computers, desktop computers, laptop computers, and the like.

As depicted, STEM system 320 receives operational information from assets 310-316. This operational information may include information about the devices connecting with the assets, the type of data be communicated over the assets, the number of times a device contacts an asset, and other similar operational information. Based on the operational information, SIEM system 320 identifies an incident with a router in routers 311. This incident may include an unknown IP address, an improper number of requests over the router, or any other incident within the router. Once identified, the incident is forwarded to advisement system 330, wherein advisement system 330 will identify enrichment data for the incident. This enrichment information may include information about the IP address related to the incident, the URL address associated with the incident, or any other information related to the incident. For example, SIEM system 320 may identify an incident corresponding to an unknown URL connection with the router in routers 311. Once advisement system 330 is notified of the incident, advisement system 330 may query a database or external source to determine information about the URL, including whether the URL is malicious, the owner of the URL, the relation of the URL to the devices in the network, or any other enrichment information.

Once enrichment information is gathered, advisement system 330 may determine a confidence level of whether the incident involves a security threat and a rule set based on the enrichment information. Referring again to the previous example, advisement system 330 may determine that the particular URL has been associated with a malicious virus. Accordingly, the confidence level and rule set may reflect that there is a security threat related to the URL on the router. In contrast, if no enrichment information is available, a lower confidence level may be defined for the incident and a separate rule set may be defined for the router.

Upon determining the confidence level and rule set, one or more action recommendations may be transferred to administration system 350 and administrator 360 based on the enrichment information. In some examples, advisement system 330 may include action routing information that identifies personnel responsible for each of the assets within the computing network. For example, a first administrator may be responsible for particular applications, whereas second administrator may be responsible for the routers and the switches. Thus, once an action is identified, advisement system 330 may direct the action recommendations to the proper administration personnel. Further, in some instances, the administration personnel may be tiered to respond to each of the security threats. This use of tiers allows recommendations to be forwarded to a second personnel member if a first member has not responded to the recommendations.

Further, although illustrated as providing recommendations to an administrator in the present example, it should be understood that an administrator might preapprove particular actions as part of a rule set. Thus, if a particular threat is identified, predefined actions might be taken based on the confidence level and rule set. Additionally, the actions that are provided to an administrator may be based on previous selections of the administrator. For example, a list of recommendations is provided to the administrator for a particular threat, and the user makes an initial action selection from the list. On the next occurrence of the same or similar threat, the recommendations that are provided to the user may include a new list of recommendations based on the user's previous selection for the identified threat. Thus, as input is collected from each of the administrators within the computing environment, recommendations may improve based at least in part on previous recommendation selections.

In some examples, the action recommendations referred to administrator 360 may change in accordance with a change in the confidence level. For example, when an incident is first encountered, advisement system 330 may transfer a first set of recommended actions based on the unknown threat level of the incident. However, as further enrichment information is gathered about the incident, a second set of recommended actions may be transferred to the administrator. Thus, the action recommendations may be dynamic in accordance with the current confidence in the threat presented and the rule set corresponding to the confidence.

In some implementations, the advisement system may generate action recommendations based on the cost of the asset or the cost of the action. This cost determination may be assigned by administrators of the computing environment, may be based on the type of information that is stored on the computing asset, may be determined based on the amount of disruption that an action may cause in the environment, or may be determined by any other method. For example, a financial officer's computing system in the computing environment may have a higher cost or priority than an intern's computing system due to the data that is accessible from the computing systems. Accordingly, action recommendations for the financial officer's computing asset may be different than the action recommendations that are generated for the intern's computing asset. Further, the action recommendations may also be allocated a cost rating that relates each of the actions to an effect that the actions will have on the environment. For example, the cost of an action that places a computing asset into a virtual local area network (VLAN) may have a higher cost or be more disruptive to the computing environment than preventing the computing asset from communicating with particular IP addresses. Based on the importance or cost of the system and the cost of the actions, recommendations may be provided to the administrator. As an example, a computing asset that requires high availability may be provided with actions that do not disrupt availability of the asset. Likewise, if the system includes sensitive data, actions may be more conservative to prevent the sensitive data from being inappropriately accessed.

Figure 4:
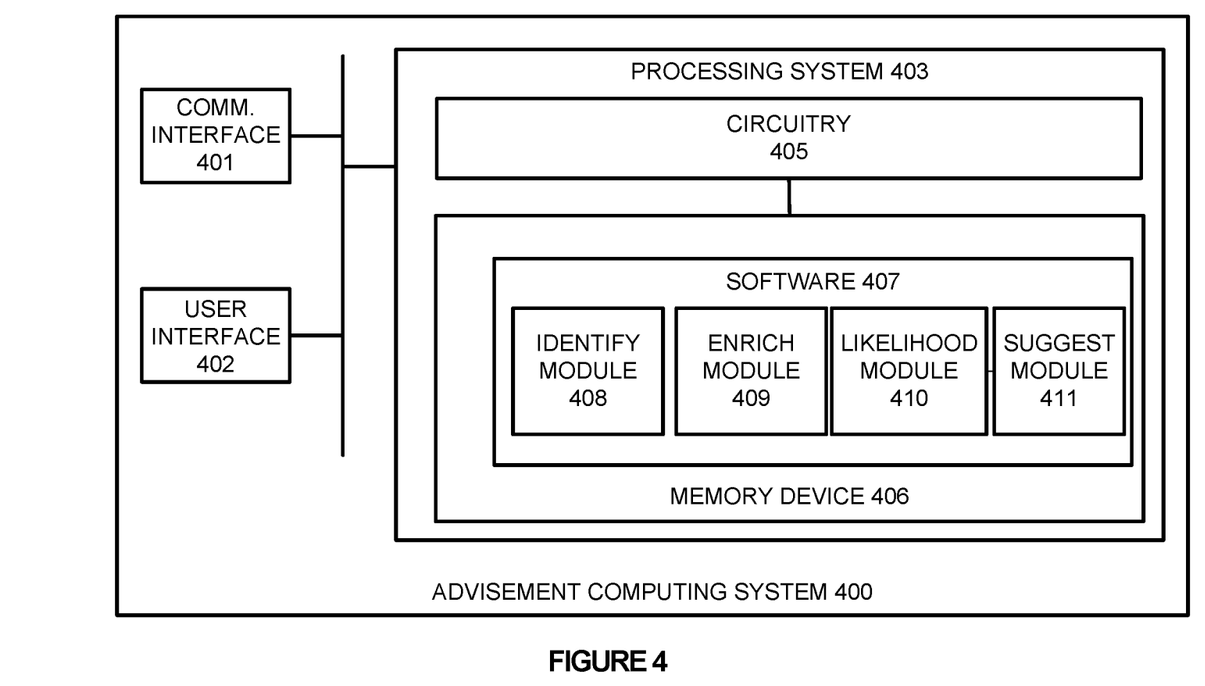
FIG. 4 illustrates an advisement computing system to provide action recommendations for a plurality of network assets.

Turning to FIG. 4, FIG. 4 illustrates an advisement computing system 400 to provide action recommendations for a plurality of network assets. Advisement computing system 400 is representative of a computing system that may be employed in any computing apparatus, system, or device, or collections thereof, to suitably implement the advisement system operations described herein. Computing system 400 comprises communication interface 401, user interface 402, and processing system 403. Processing system 403 is communicatively linked to communication interface 401 and user interface 402. Processing system 403 includes processing circuitry 405 and memory device 406 that stores operating software 407.

Communication interface 401 comprises components that communicate over communication links, such as network cards, ports, RF transceivers, processing circuitry and software, or some other communication devices. Communication interface 401 may be configured to communicate over metallic, wireless, or optical links. Communication interface 401 may be configured to use TDM, IP, Ethernet, optical networking, wireless protocols, communication signaling, or some other communication format—including combinations thereof. In particular, communication interface 401 communicates with a SIEMs system that gathers security incident information from a plurality of assets within a computing environment. Further, communication interface 401 may be configured to communicate with one or more administrations systems to provide the suggested course of action to administrators.

User interface 402 comprises components that interact with a user. User interface 402 may include a keyboard, display screen, mouse, touch pad, or some other user input/output apparatus. User interface 402 may be omitted in some examples.

Processing circuitry 405 comprises microprocessor and other circuitry that retrieves and executes operating software 407 from memory device 406. Memory device 406 comprises a non-transitory storage medium, such as a disk drive, flash drive, data storage circuitry, or some other memory apparatus. Operating software 407 comprises computer programs, firmware, or some other form of machine-readable processing instructions. Operating software 407 includes identify module 408, enrichment module 409, likelihood module 410, and suggest module 411, although any number of software modules may provide the same operation. Operating software 407 may further include an operating system, utilities, drivers, network interfaces, applications, or some other type of software. When executed by circuitry 405, operating software 407 directs processing system 403 to operate advisement computing system 400 as described herein.

In one example, identify module 408 is configured to, when executed by advisement computing system 400 and processing system 403, to identify a security incident for an asset within the computing environment. Once identified via a SIEM system or other security monitoring module, enrichment module 409 identifies enrichment information for the security incident. This enrichment information may be gathered from sources internal to the computing environment, as well as external sources, such as websites and databases. For example, if an asset within the computing environment was connecting in an abnormal way to a particular IP address, enrichment module 409 may contact one or more sources to determine information about the unknown IP address. These sources may include information about whether the address is malicious, whether the address belongs to a particular entity, or any other similar information regarding the IP address.

Once the enrichment information is determined, likelihood module 410 may determine a threat confidence level and rule set for the security incident based on the enrichment information. This confidence level relates the security incident to the likelihood that the incident is related to a malicious activity. For instance, if an external source verified that an IP address corresponded to malicious software activity, the confidence level and rule set would be different than for an unknown IP address. Once the confidence level and rule set is determined, suggest module 411 determines suggested security actions for an administrator based on the identified rule set. These suggestions may include suggestions to eliminate a malicious item related to the security incident, segregating the asset from other assets within the network, imaging computing system to provide further analysis on the incident, amongst a variety of other suggested security actions.

Figure 5:
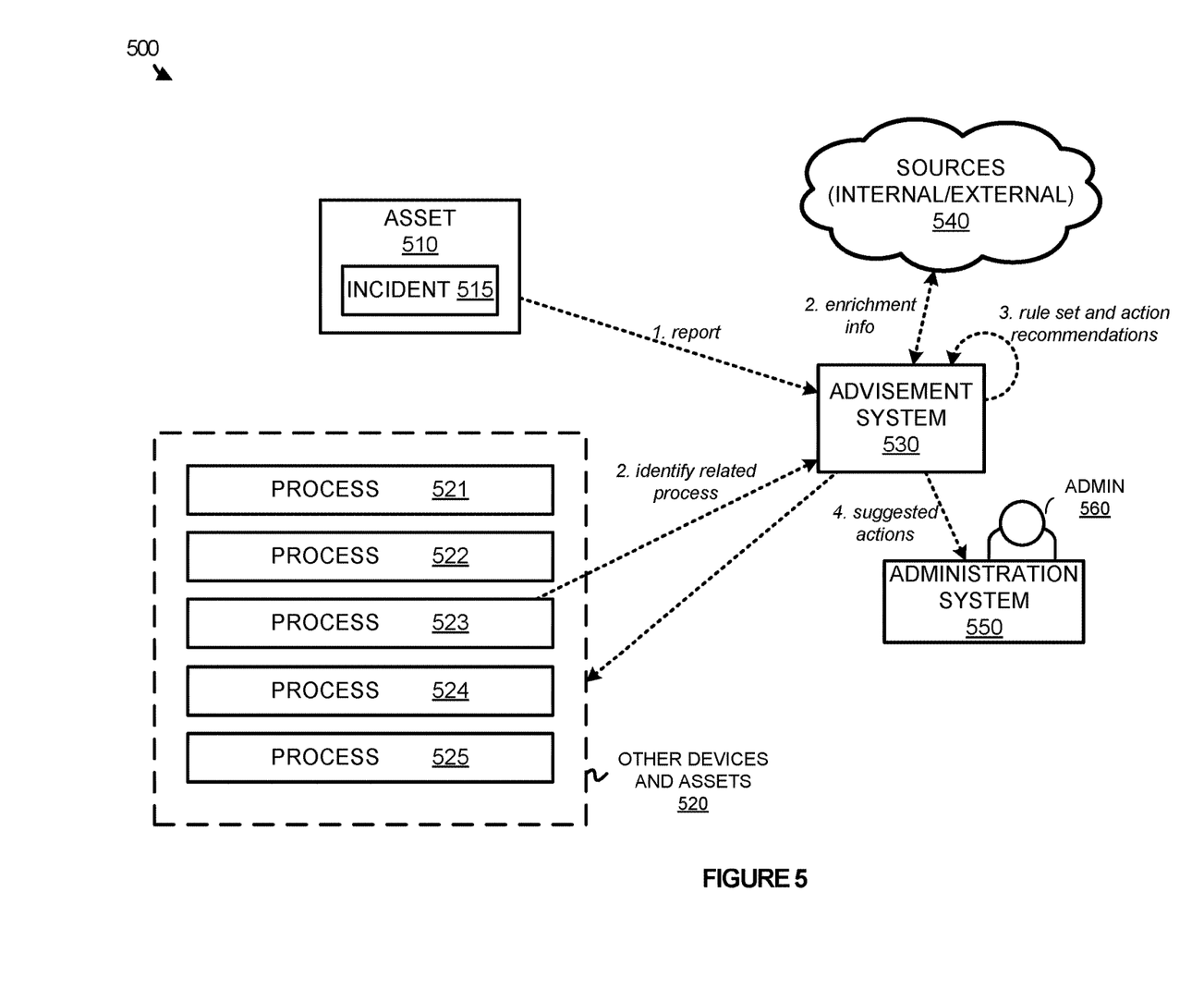
FIG. 5 illustrates a computing environment to identify rule sets and recommend security actions for security incidents.

Referring now to FIG. 5, FIG. 5 illustrates a computing environment 500 to identify rule sets and recommend security actions for security incidents. Computing environment 500 includes asset 510, other devices and assets 520, advisement system 530, internal and external sources 540, and administration system 550. Asset 510 is further associated with incident 515, and other devices and assets 520 execute processes 521-525. Asset 510 and other devices and assets 520 may comprise routers, switches, operating systems, applications, processes, or any other similar asset within a computing environment.

As illustrated, advisement system 530 identifies an incident 515 related to asset 510. This incident report may include an identifier for the asset, an identifier for the computing device associated with the asset, a URL associated with the incident, an application, process, or executable for the incident, or any other similar information about the incident. For example, if incident 515 corresponded to an executable, the report to advisement system 530 may include the name, file path, and other related information to the executable. In some implementations, the report may be generated by a SIEM system to be provided to advisement system 530. However, in other examples, the report may be generated by other security devices including, but not limited to, the devices associated with the assets, or other security monitoring hardware.

Once a report of incident 515 is received, advisement system 530 may gather enrichment information from sources 540 to gather further data related to the particular incident. For example, if the incident were related to communications with a particular IP address, advisement system 530 may query a database, either internal or external to the computing environment, to determine if the IP address is related to malicious activity. Here, in addition to querying the internal and external sources, advisement system 530 identifies related processes to incident 515. For example, incident 515 may be related to a particular application within the network, such as a database application or some other application. Once an incident is identified with the application, advisement system 530 may determine other applications or processes that require access to the database application. The processes may include, but are not limited to, back-end processes and data processing processes. Based on the information gathered from asset 510, enrichment information gathered from internal and external source 540, and related processes identified from processes 521-525, advisement system 530 identifies a rule set for the incident.

For example, because process 523 is identified as relating to or requiring asset 510 for operation, a particular rule set may be selected based on this determination to continue to provide services to process 523. Once the rule set is selected, advisement system 530 may determine one or more action suggestions to take against incident 515 based on the rule set and provide them to administrator 560 at administration system 550. Although illustrated separately in the present example, it should be understood that administration system 550 might reside wholly or partially on advisement system 530.

While illustrated in FIG. 5 as inquiring other devices and assets 520 to determine the related processes to asset 510, it should be understood that in some examples a database might be maintained to relate the physical devices and processes to one another. Here, the action recommendations that are provided to administrator 560 might include actions that continue the operation of asset 510. For example, because process 523 requires asset 510 for operation, the action recommendations may include taking a snapshot of asset 510, limiting the communications that can be made by asset 510, limit the type of data that is communicated by asset 510, or other similar operations that continue the operation of asset 510.

In some implementations, advisement system 530 may identify a report of a possible malicious application on a particular asset. Responsive to the report, advisement system 530 may determine if the application is a known application based on a known repository of applications within the environment. If advisement system 530 determines that the application is known for the environment, a rule set and actions may be provided to the administrator that may allow the application to continue operation with particular limitations or monitoring. In contrast, if advisement system 530 determines that the application is unknown within the environment, the rule set and action recommendations may prescribe removing the application and the related application data from the environment.

Figure 6:
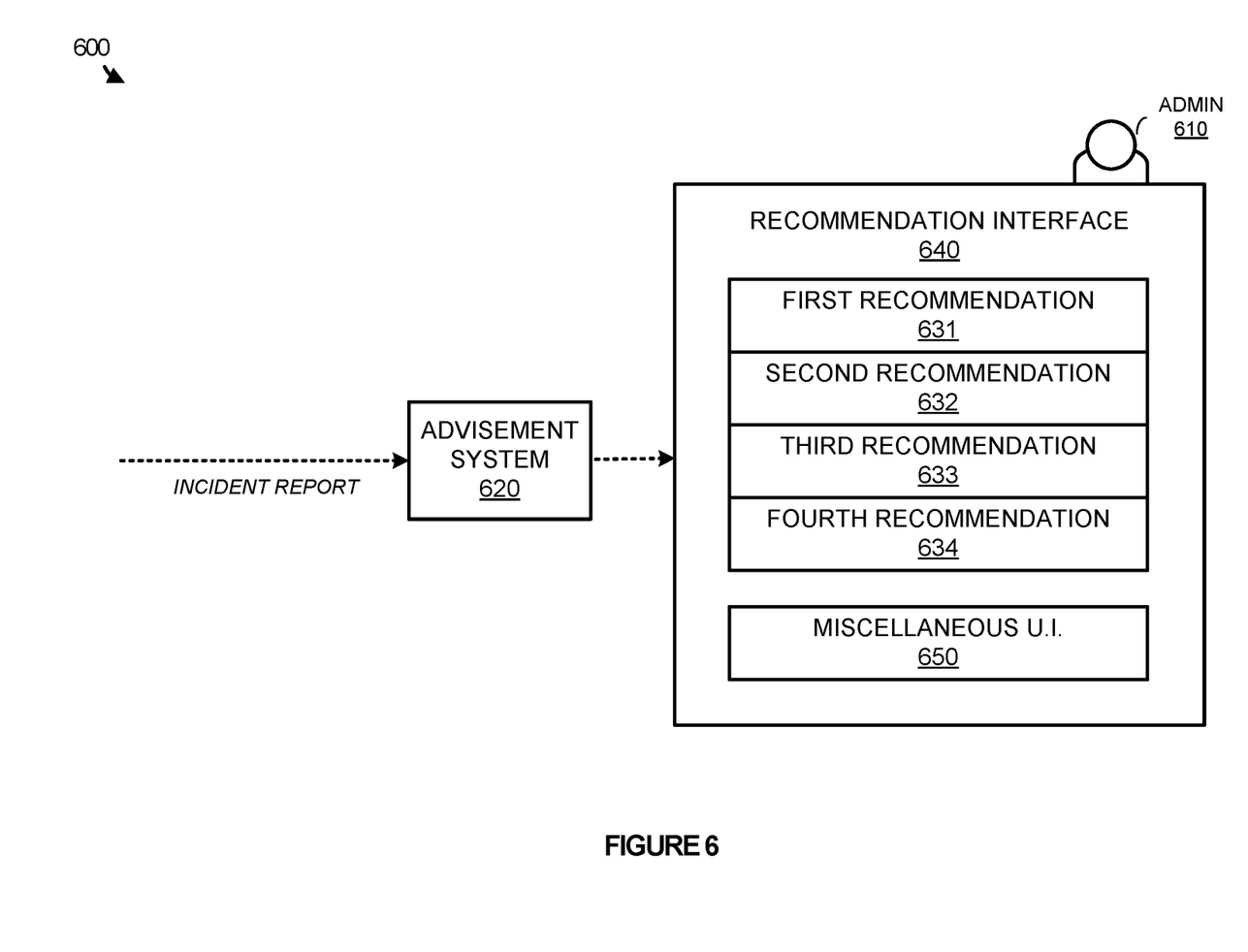
FIG. 6 illustrates an overview of providing a recommendation interface for an administrator of a computing environment.

FIG. 6 illustrates an overview 600 of providing a recommendation interface for an administrator of a computing environment. Overview 600 includes advisement system 620 and recommendation interface 640. Recommendation interface 640 further includes recommendations 631-634 and miscellaneous user interface (U.I.) 650. As illustrated in the present example, advisement system 620 is configured to identify reports of possible security incidents within a computing environment. This computing environment includes a plurality of computing systems and devices, including switches, computers, routers, or other similar computing hardware. These reports may include information about the type of security incident, an identifier for the asset with the incident, IP address information related to the incident, information about a process or executable related to the incident, or any other similar information.

In response to receiving the report, advisement system 620 may use the information about the incident to query internal and external sources for enrichment data related to the incident. For example, if advisement system 620 received a report regarding a particular executable within the computing environment, advisement system 620 may query one or more databases to determine whether the executable was malicious. In some implementations, advisement system 620 may identify whether the asset related to the issue is required or associated with any other asset within the environment. Thus, if the asset is required by one or more processes or systems, action recommendations may be identified that allow the required processes or systems to continue to access the asset in question.

In the present example, once the enrichment information is gathered and a rule set identified, recommendations may be defined based on the rule set and provided to an administrator as recommendation interface 640. Recommendation interface 640 may be displayed locally via a screen or other interface on advisement system 620, or may be displayed at a user console, such as a desktop, laptop, tablet, or other similar computing device. Here, recommendation interface 640 includes four recommendations 631-634, although any number of recommendations may be provided to an administrator, and further includes miscellaneous user interface 650. Miscellaneous user interface 650 may include a chat window, a programming interface allowing the user to program various actions for the assets within the computing environment, amongst a variety of other possible user interactions.

For example, the chat window may allow a plurality of administrators within the organization discuss the security incidents and possible actions or responses to the incidents. In some implementations, the chatroom that is provided to administrator 610 may include administrators that are approved to take action against a particular incident. For instance, an organization may permit four administrators to take action against a malware incident within a database computing system. Accordingly, when the incident is identified, the recommendation interface that is provided to each of the administrators may allow the four approved administrators to discuss the incident, and identify the appropriate action to take against the incident.

Once administrator 610 selects a recommendation of recommendations 631-634 to be taken against the security incident, advisement system 620 may initiate the activities necessary to implement the requested action. In some implementations, advisement system 620 may provide administrator 610 with the workflow or the procedural steps to implement the desired action. For example, if the action required the modification of a firewall within the computing environment, advisement system 620 may present the user with the necessary steps to implement the change to the firewall, including logging into the necessary device and making the necessary changes.

In other implementations, rather than requiring administrator 610 to step through each phase necessary for a particular action, advisement system 620 may be configured to automate the implementation of the actions. To automate the action implementations, in some examples, advisement system 620 may be configured with various connectors or translators that are used to configure each of the assets and computing systems within the environment. These connectors may be used to take a recommendation such as "block all communications from IP address X," and convert the recommendation into a script to implement the recommendation in a firewall. Thus, although each of the assets may require a different programming language or application program interface, advisement system 620 may implement the actions in a scripted format for each of the assets. In some implementations, the administrators of the computing environment may generate the configurations. In other examples, the connector configurations may be gathered from a database that allows the connectors to be generated and shared across various computing environments and organizations. Accordingly, an administrator for one computing environment may generate a connector that can be used by other administrators in other computing environments to script the implementation of a particular action. Once the connector information is configured with advisement system 620, advisement system 620 may communicate with the devices, computing systems, and software of the computing environment to implement the desired security actions of administrator 610.

For example, a computing environment may include firewall software on one or more computing devices. To manage the firewall software, an administrator of the environment may identify, via the connector database, a connector associated with the software, and configure advisement system 620 to implement the connector. Accordingly, when an action is required that relates to the particular firewall, the connector information may be used to implement the desired action in the firewall. This connector information may include the necessary commands and scripts to block a particular IP address, permit a particular IP address, block particular data requests, or any other similar configuration information.

Figure 7:
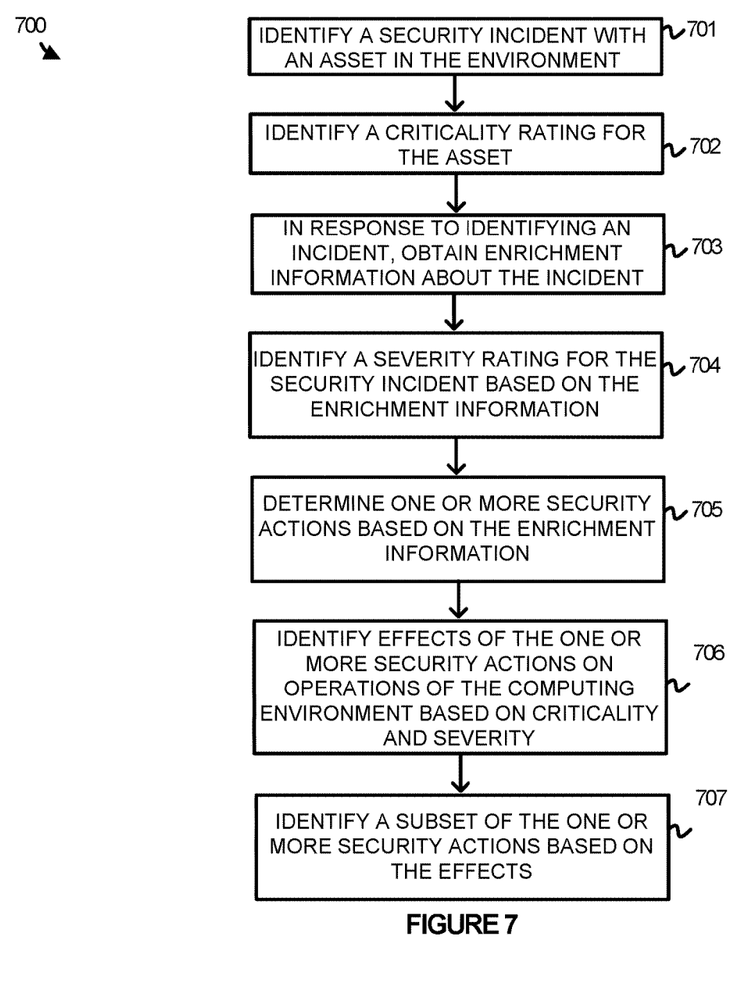
FIG. 7 illustrates a method of operating an advisement system to provide security actions according to one implementation.

FIG. 7 illustrates a method 700 of operating an advisement system to provide security actions according to one implementation. The operations of FIG. 7 are referenced parenthetically in the paragraphs that follow with reference to systems from computing environment 100 of FIG. 1.

As illustrated in method 700, advisement system 130 identifies a security incident with an asset in computing environment 100 (701). This incident may be reported by STEM system 120, may be provided by a user of an asset in computing environment 100, or may be reported by any other security personnel, software, or hardware in computing environment 100. For example, a user may provide an email, a ticket, or some other notification to advisement system 130 indicating the security incident. Once the incident is received, advisement system 130 determines a criticality rating for the asset (702), which may be defined by an administrator of the environment or may be determined based on the operations of the asset. In particular, the criticality rating may be determined based on the user associated with the asset, the type of data accessible to the asset, the importance of the asset to other assets within the computing environment, or any other criticality measurement, including combinations thereof. The criticality rating may comprise a numerical rating, a letter rating, or any other rating capable of creating a hierarchy of the assets of the computing environment.

In addition to determining the criticality rating, advisement system 130 further obtains enrichment information about the incident from internal and external sources 140 (703). These sources may include webpages, databases, or any other similar system capable of providing information about a security threat. In some implementations, the security incident that is reported to advisement system 130 may include information or traits about the incident including, but not limited to, an identifier of the asset affected by the threat, URL and IP information about the threat, process or service names for the threat, file names for the threat, or any other similar information. This information may then be supplied to sources 140 to determine the supplemental information for the incident, wherein the supplemental information may include an indication of the type of threat, an indication of how severe the threat is to the environment, traits about the threat, including the source of the threat and target information of the threat, and possible security actions to take against the threat.

Once the enrichment information is obtained, advisement system 130 identifies a severity rating for the security incident based on the enrichment information (704) to indicate how dangerous or malicious the threat is to the computing environment, and determines one or more security actions based on the enrichment information (705). In some implementations, the severity rating and the security actions may be provided in the enrichment information from sources 140. However, in other implementations, the enrichment information may be used to search data structures, such as trees, lists, and tables to determine security actions that correspond to the type of threat identified in the environment. The severity rating determined by advisement system 130 may comprise a numerical identifier, a letter grade, or any other identifier to indicate the how malicious or dangerous the threat in the incident is to the computing environment. For example, a process that is required for normal operations of the computing environment would not have the same severity rating as a virus that transmits data to an outside location.

After the one or more security actions are identified, advisement system 130 identifies effects of the one or more security actions on the operations of the computing environment based on the criticality rating and the severity rating (706). These effects may be positive, such as actions that remove viruses or prevent the malicious processes from spreading to other computing systems in the environment, among other possible effects. However, the effects may also be negative, such as preventing access to an affected computing system, preventing certain operations within the computing environment, along with other negative effects. Based on the effects of each security action, advisement system 130 may identify a subset of the one or more security actions (707). This identification of a subset of security actions may be based on algorithms, data structures, and other similar operations that can compare the positive effects in the environment with the negative effects in the environment to select appropriate actions to respond to the security incident.

For example, if an asset is highly critical and the security threat for the incident is not considered to be severe, actions that limit the operation of the highly critical asset for an extended period of time may not be selected as part of the subset of the one or more actions. However, if the asset is highly critical and the threat is considered to be severe, advisement system 130 may identify an action that limits operation of the asset for a period time for the subset. Thus, because the threat is severe, it may be more desirable to have the threat removed than continue the operation of the asset to minimize the effect on the computing environment.

In some implementations, advisement system 130 may use algorithms, data structures that include information about the interaction of the computing systems and assets, and other similar information to determine the effect that each action will have on the environment. Once the information is processed, a subset of the actions may be selected to respond to the security threat. This subset could include actions that would meet effect criteria on the computing environment, actions that would provide the best chance of removing the threat corresponding to the incident, or any other subset of the actions. In some examples, the subset of actions that are identified may be ranked based on the effect that the actions would have on the environment. For example, actions that have a low impact on the operations of the environment and are capable of removing the threat associated with the incident would be ranked higher than actions that have a high impact on the operations of the environment and are less likely to remove the threat associated with the incident.

In some instances, once the subset of the security actions is identified for the incident, advisement system 130 may initiate the implementation of the actions to the environment. For example, if a security action included removing a process from the computing environment, advisement system may initiate the procedures to remove the process. This may include identifying hardware and software configurations for the computing systems with the process, and applying individual procedures to each of the assets to remove the process. The individualization of procedures to apply a security action may be implemented using connectors, which can be configured to implement actions across a range of hardware and software configurations. Thus, although an action may be written in a first language, the connectors may translate the request into the required procedures to implement the action in the environment and the various hardware and software resources.

In some implementations, in addition to or in place of automating the action implementation, an administrator may be provided with the subset of actions. Referring to FIG. 1, administrator 160 is provided with a subset of actions at administration system 150. In response to being provided with the subset of actions, administrator 160 may select at least one action that is received by advisement system 130 from administration system 150. Once the selected actions are received, advisement system 130 initiates implementation of the actions within the environment. To implement the actions, advisement system 130 may use the connectors described above for the various hardware and software configurations of the computing environment. For example, administrator 160 may provide an action in a first programming language, which is in text, image, or some other form and is translated into the required commands for the hardware and software configurations of the computing assets.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computer-implemented method, comprising:
receiving data indicating an occurrence of a security incident involving a computing asset of a computing environment;
identifying properties associated with the security incident;
obtaining, using the properties, enrichment information associated with the security incident from one or more internal or external sources;
determining, based on the enrichment information, a severity rating for the security incident and a confidence level of whether the security incident involves a security threat;
determining, based on at least the enrichment information, the severity rating, and the confidence level, one or more actions to respond to the security incident; and
initiating implementation, in the computing environment, of at least one action from the one or more actions.

2. The method of claim 1, further comprising:
obtaining further enrichment information associated with the security incident from the one or more internal or external sources;
determining, based on the further enrichment information, a further confidence level of whether the security incident involves a security threat; and
determining, based on at least the further enrichment information, one or more further actions to respond to the security incident.

3. The method of claim 1, wherein the severity rating indicates how dangerous or malicious a threat is to the computing environment.

4. The method of claim 1, wherein the severity rating is provided in the enrichment information.

5. The method of claim 1, wherein the severity rating comprises a numerical identifier or a letter grade.

6. The method of claim 1, further comprising determining, based on at least the enrichment information, a criticality rating associated with the computing asset, wherein determining the one or more actions to respond to the security incident is further based on the criticality rating.

7. The method of claim 6, wherein the criticality rating indicates an importance of the computing asset to operation of the computing environment.

8. An apparatus, comprising:
one or more non-transitory computer-readable storage media;
a processing system operatively coupled to the one or more non-transitory computer-readable storage media; and
processing instructions stored on the one or more non-transitory computer-readable storage media that, when executed by the processing system, direct the processing system to:
receive data indicating an occurrence of a security incident involving a computing asset of a computing environment;
identify properties associated with the security incident;
obtain, using the properties, enrichment information associated with the security incident from one or more internal or external sources;
determine, based on the enrichment information, a severity rating for the security incident and a confidence level of whether the security incident involves a security threat;
determine, based on at least the enrichment information, the severity rating, and the confidence level, one or more actions to respond to the security incident; and
initiate implementation, in the computing environment, of at least one action from the one or more actions.

9. The apparatus of claim 8, comprising further processing instructions stored on the one or more non-transitory computer-readable storage media that, when executed by the processing system, further direct the processing system to:
obtain further enrichment information associated with the security incident from the one or more internal or external sources;

determine, based on the further enrichment information, a further confidence level of whether the security incident involves a security threat; and determine, based on at least the further enrichment information, one or more further actions to respond to the security incident.

10. The apparatus of claim 8, wherein the severity rating indicates how dangerous or malicious a threat is to the computing environment.

11. The apparatus of claim 8, wherein the severity rating is provided in the enrichment information.

12. The apparatus of claim 8, wherein the severity rating comprises a numerical identifier or a letter grade.

13. The apparatus of claim 8, comprising further processing instructions stored on the one or more non-transitory computer-readable storage media that, when executed by the processing system, further direct the processing system to determine, based on at least the enrichment information, a criticality rating associated with the computing asset, wherein determining the one or more actions to respond to the security incident is further based on the criticality rating.

14. The apparatus of claim 13, wherein the criticality rating indicates an importance of the computing asset to operation of the computing environment.

15. A non-transitory computer-readable storage medium storing instructions that, when executed by one or more processors, cause performance of operations comprising:

receiving data indicating an occurrence of a security incident involving a computing asset of a computing environment;

identifying properties associated with the security incident;

obtaining, using the properties, enrichment information associated with the security incident from one or more internal or external sources;

determining, based on the enrichment information, a severity rating for the security incident and a confidence level of whether the security incident involves a security threat;

determining, based on at least the enrichment information, the severity rating, and the confidence level, one or more actions to respond to the security incident; and initiating implementation, in the computing environment, of at least one action from the one or more actions.

16. The non-transitory computer-readable storage medium of claim 15, further comprising:

obtaining further enrichment information associated with the security incident from the one or more internal or external sources;

determining, based on the further enrichment information, a further confidence level of whether the security incident involves a security threat; and determining, based on at least the further enrichment information, one or more further actions to respond to the security incident.

17. The non-transitory computer-readable storage medium of claim 15, wherein the severity rating indicates how dangerous or malicious a threat is to the computing environment.

18. The non-transitory computer-readable storage medium of claim 15, wherein the severity rating is provided in the enrichment information.

19. The non-transitory computer-readable storage medium of claim 15, wherein the severity rating comprises a numerical identifier or a letter grade.

20. The non-transitory computer-readable storage medium of claim 15, storing further instructions that, when executed by one or more processors, cause performance of further operations comprising determining, based on at least the enrichment information, a criticality rating associated with the computing asset, the criticality rating indicating an importance of the computing asset to operation of the computing environment, wherein determining the one or more actions to respond to the security incident is further based on the criticality rating.

\* \* \* \* \*